March 3, 1970 K. NEGORO 3,497,917
BEAD FORMATION
Filed April 11, 1967 2 Sheets-Sheet 1
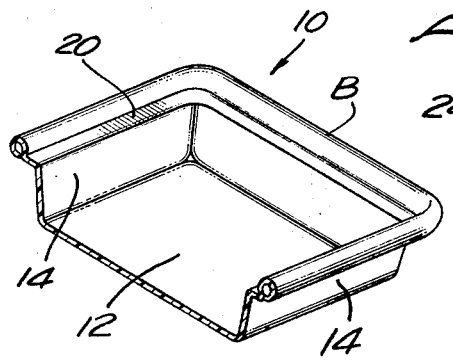
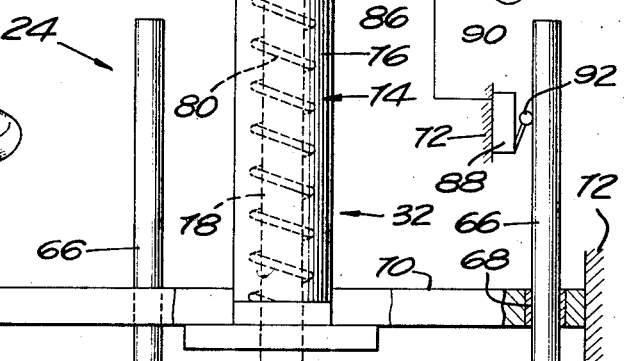
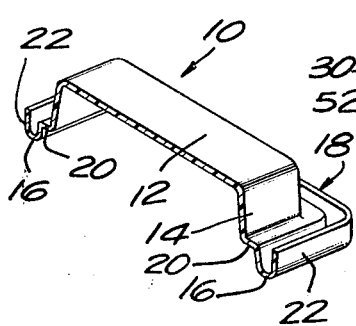
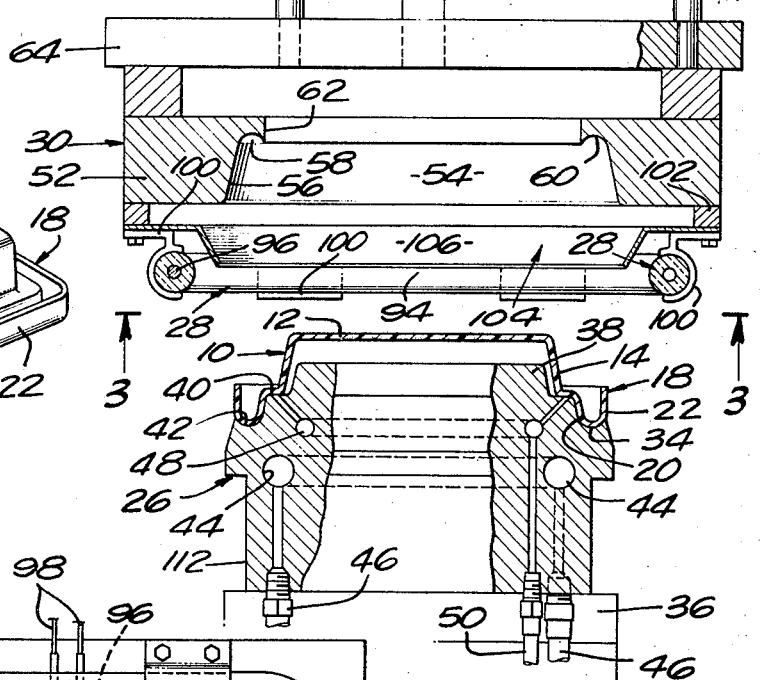
KAIJI NEGORO
INVENTOR.
BY Warren T. Jessup
ATTORNEY March 3, 1970 K. NEGORO 3,497,917
BEAD FORMATION Filed April 11, 1967 2 Sheets-Sheet 2

KAIJI NEGORO
INVENTOR.

BY Warren T. Jessup
ATTORNEY

United States Patent Office 3,497,917
Patented Mar. 3, 1970

3,497,917
BEAD FORMATION
Kaiji Negoro, Montibello, Calif., assignor to Kimatic, Inc., Tustin, Calif., a corporation of Delaware
Filed Apr. 11, 1967, Ser. No. 630,018
Int. Cl. B29c *17/02*
U.S. Cl. 18—19                                                  8 Claims

ABSTRACT OF THE DISCLOSURE

Apparatus for forming a beaded edge about the rim of a thin-walled thermoplastic article, having a preformed outwardly directed rim flange, including an outer depending marginal skirt portion, by supporting the article on a holding die and effecting relative movement of the holding die and a curling die mounting in advance thereof a heat source conforming to the contour of the article skirt portion in such a way that relative movement of the dies and heat source occurs through an initial heating position, wherein the heat source is disposed opposite the article skirt portion for heating the latter to a relatively soft plastic forming state, to a final curling position, wherein the curling die engages and curls the heated skirt portion into a cylindrical bead configuration.

---

This invention relates generally to the plastic forming art. More particularly, the invention relates to apparatus for, heating and curling the depending skirt portion of a preformed rim flange on a thin-walled thermoplastic article, such as a container, to form the skirt portion into a generally cylindrical bead configuration.

Many molded plastic articles, such as cups, fruit trays, food containers, and the like, have relatively thin walls which are preferably reinforced in some way to afford the articles with adequate strength and rigidity for their intended uses. One common method of reinforcing a thin-walled molded plastic article of circular cross section, such as a cup, for example, involves curling the rim of the article to form a beaded edge about the rim. Owing to the inherent limitations imposed by current plastic forming techniques, fabrication of a molded plastic article with a beaded edge of this kind requires a two-step forming operation involving initial molding of the article to its basic shape and subsequent curling of the article rim to form the beaded edge.

A variety of curling techniques and machines have been devised for producing beaded edges of the kind under discussion. These existing techniques and machines, however, are deficient in that they are limited to use with molded plastic articles of circular cross section. As a consequence, at the present stage of development of the curling art, the formation of a beaded edge on molded plastic articles which have other than a circular cross section is not commercially practical. For this reason, noncircular articles, such as rectangular plastic trays, for example, are currently reinforced by molding such articles with a simple nonbeaded rim flange. A nonbeaded rim flange of this kind, however, is not totally satisfactory since it possesses a raw edge which is generally quite rough or sharp. Moreover, a rim flange without a beaded edge lacks the strength and pleasing appearance of a rim flange with a beaded edge.

It is a general object of this invention to provide an improved apparatus for, curling the rim of preformed thermoplastic articles to produce a beaded edge or rim on such articles, which apparatus may be utilized with molded articles of virtually any shape in in cross section.

Another of the invention is to provide an improved curling apparatus of the character described which is relatively simple and economical in practice and construction, and otherwise ideally suited to its intended purpose.

In accordance with these and other objects which will become apparent hereinafter, the best mode contemplated for the present invention is disclosed in the accompanying drawings, wherein:

FIGURE 1a is a fragmentary perspective view, in section, of a typical molded thermoplastic article, in this instance a rectangular fruit tray shown in inverted position, which may be utilized in the present curling method and apparatus;

FIGURE 1b is a fragmentary perspective view, in section, of the fruit tray in FIGURE 1a, showing the tray in its upright position after formation of a beaded edge about the tray rim;

FIGURE 2 is a side elevation, partly in section, of a typical curling apparatus according to the invention, showing the various parts of the apparatus in their normal inoperative or retracted positions;

FIGURE 3 is a bottom view, taken on line 3—3 in FIGURE 2, of a unitary heat source and curling die embodied in the apparatus;

Figure 4:
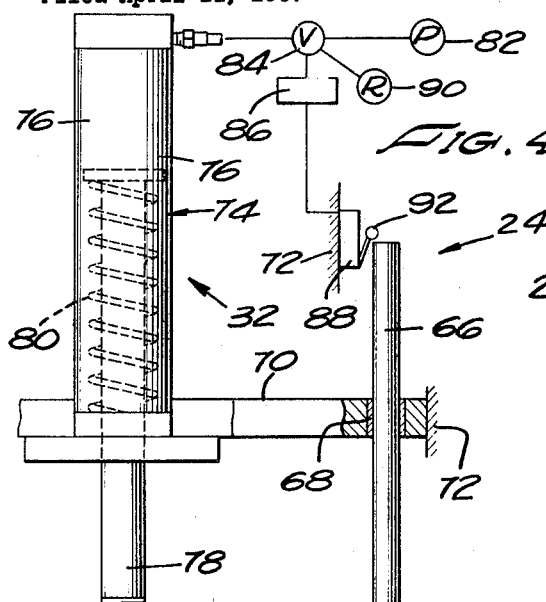
FIGURE 4 is a fragmentary side elevation, partly in section, showing the parts of the apparatus in an intermediate heating position.

Generally speaking, the present invention provides a curling apparatus for use with a preformed or molded thin-walled thermoplastic article having a rim flange including a flange portion extending outwardly from the wall of the article and a depending marginal skirt portion along the outer edge of the flange portion. Representative of such an article is a molded plastic fruit tray of the kind illustrated in transverse section in FIGURE 1a of the drawings. The illustrated fruit tray 10 is rectangular in shape and it has a rectangular bottom wall 12 bounded by an upstanding side wall 14 which slopes outwardly toward the upper edge or rim 16 of the tray.

Extending outwardly from the side wall 14, about the entire rim 16, is a rim flange 18. This rim flange projects outwardly from the tray side wall 14 in a plane parallel to the open top of the tray and then curves upwardly, outwardly, and finally downwardly to provide the flange with an inner flange portion 20 and an outer depending marginal skirt portion 22 along the outer edge of the flange portion.

According to one of its aspects, the present invention provides apparatus of forming a beaded edge on a preformed thermoplastic article such as the illustrated tray 10, by supporting the article in an initial forming position, wherein the marginal skirt portion of the article is exposed, effecting relative movement of the article and a heat source which generally conforms to and complements the contour of the article skirt portion in such a way that the article and heat source undergo relative movement through a heating position, wherein the heat source is located directly opposite and is generally uniformly spaced from the skirt portion along the entire length thereof, and the skirt portion is heated by the source to a relatively soft plastic forming state, and exerting inward curling forces on the heated skirt portion immediately following relative movement of the article and heat source from their heating positions, and while the skirt portion is still in its soft plastic forming state, to curl the skirt portion into a generally cylindrical bead configuration B.

In the preferred practice of the invention, the relative movement of the article and heat source is momentarily arrested in the heating position to permit heating of the article skirt portion to the optimum plastic forming temperature. According to a more specific and further preferred practice of the invention, the curling method outlined above is accomplished by supporting the article in a forming position on a holding die in such a way that the skirt portion of the article is exposed beyond the die and then effecting relative movement of the holding die, the heat source, and a curling die in such a manner that the heat source and curling die undergo relative movement in unison with respect to the holding die through an initial position, wherein the heat source and the article on the holding die are disposed in their heating positions, to a following position, wherein the curling die engages and curls the heated skirt portion on the article into a cylindrical bead configuration. Preferably, the inner flange portion of the article rim flange is engaged by a heat sink surface which is effective to cool and thereby to prevent undesirable heating and softening of the inner flange portion during heating of the skirt portion.

According to another of its aspects, the invention provides a curling apparatus, represented in FIGURES 1 through 5 by the apparatus 24, for practicing the curling or bead-forming method discussed hereinbefore. In general terms, the present curling apparatus comprises a holding die 26 for supporting, in forming position, the preformed thermoplastic article 10 to be provided with a beaded edge, a heat source 28 which generally conforms to and complements the contour of the article skirt portion 22 for heating the skirt portion to its soft plastic forming state, a curling die 30, and operating means 32 for effecting relative movement of the dies and heat source in such a way that the heat source and article on the holding die undergo initial relative movement through their heating positions and, immediately thereafter, the curling die and article undergo relative movement to a curling position wherein the curling die engages and curls into a cylindrical bead configuration the pre-heated skirt portion on the article. According to the earlier mentioned preferred practice of the invention, relative movement of the heat source and holding die is momentarily arrested when the heat source and article occupy their heating positions, thus to permit heating of the article skirt portion to an optimum plastic forming temperature. A highly unique and particularly beneficial feature of the invention resides in the conforming or complementary shape of the heat source relative to the contour of the article skirt portion 22, whereby when the heat source and skirt portion are disposed in their heating positions, the source is generally uniformly spaced from the skirt portion along the entire length of the latter and thereby heats the entire skirt portion to a relatively uniform plastic- forming temperature. Moreover, as will appear from the ensuing description, the heat source may be shaped to conform to an article rim flange skirt portion of virtually any contour, whereby the present curling apparatus may be utilized form a beaded edge on a molded plastic article of virtually any shape in cross section. A further preferred and highly unique feature of the invention involves the fact that the heat source 28 may be mounted directly on the curling die 30, in advance thereof, for unified relative movement of the heat source and curling die with respect to the holding die and through the heating and curling positions referred to above. Preferably, the holding die remains stationary and the curling die and heat source move in unison toward and away from the holding die. According to a further preferred feature of the invention, the holding die 26 is provided with a heat sink surface 34 which seats the inner flange portion 20 of the article 10, immediately adjacent its marginal skirt portion 22, for cooling and thereby preventing undesirable heating and softening of this flange portion during heating of the skirt portion.

Referring now in more detail to the drawings, the curling apparatus 24, which has been selected for illustration in FIGURES 1 through 5, has a holding die 26 that is generally rectangular in shape and is releasably secured to the upper side of a stationary die holder 36. The holding die has an upper raised central crown portion 38 surrounded by an outwardly directed upwardly facing ledge or shoulder 40. The crown portion and shoulder are rectangular in horizontal section. Outwardly of the shoulder 40, the holding die 26 is formed with an arcuate, upwardly opening groove or recess 42 of rectangular outline in plan view which surrounds and is located below the level of the die shoulder. The holding die is shaped and dimensioned to receive and support the preformed or molded plastic article to be curled, in this instance the fruit tray 10, in an inverted forming position, best illustrated in FIGURE 2, wherein the crown portion 38 of the die projects upwardly into the interior space of the tray, and the die shoulder 40 and recess 42 seat the inner rim flange portion 20 of the tray. It is significant to note here that when the tray is supported in this inverted forming position on the holding die, the article skirt portion 22 extends upwardly in spaced exposed relation to the die. the article skirt portion 22 extends upwardly in spaced exposed relation to the die. The arcuate wall surface of the holding die recess 42 forms the heat sink surface 34, referred to earlier.

As heretofore mentioned, the heat sink surface 34 is designed to cool and thus prevent undesirable heating and softening of the inner flange portion 20 of the tray 10. This heat sink or cooling function of the surface may be aided by inducing coolant flow through a cooling passage 44 in the holding die 26. This passage communicates with a coolant source and receiver through hoses 46. It is desirable to firmly retain the tray 10 in its inverted forming position on the holding dies 26 during operation of the curling apparatus 24. To this end, the holding die is formed with vacuum passage means 48 which communicate with a vacuum source through a hose 50 and open through the upper surfaces of the holding die, as shown, in such a way that evacuation of the passage means is effective to firmly clamp the tray to the die.

The curling die 30 is located over the holding die 26 and includes a horizontal rectangular die plate 52 having a central generally rectangular opening 54 vertically aligned with the holding die. This opening is bounded by a side wall 56 which slopes inwardly at a small angle toward the upper side of the die plate and then curves inwardly and downwardly to define a downwardly opening curling channel 58 along the upper margin of the side wall. This channel has a concave wall surface 60 of generally semicircular curvature in transverse vertical section. The inner edge of the channel surface 60 joins the vertical wall 62 which surrounds the reduced upper end of the die plate opening 54. The die plate opening 54 is shaped and dimensioned to accommodate downward movement of the curling die 30 over the inverted tray 10 on the holding die 26, the lower curling position of the curling die illustrated in FIGURE 5, wherein the upper arcuate curling channel surface 60 engages the skirt portion 22 of the tray 10 on the holding die and curls this skirt portion inwardly and downwardly into a generally cylindrical bead configuration. The currently uppermost, bottom portion of the tray then protrudes through the reduced upper end of the die opening 54 and above the upper surface of the die.

Figure 5:
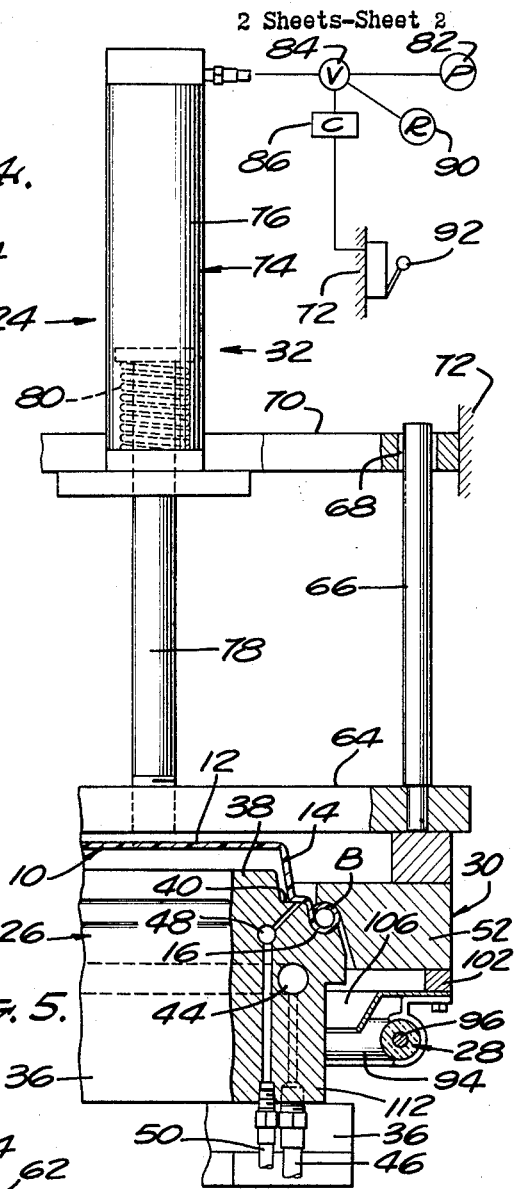
FIGURE 5 is a view similar to FIGURE 4, showing the parts of the apparatus in a final curling position.

In the particular curling apparatus illustrated, the curling die 30 is supported for vertical movement relative to the holding die 26 between its lower curling position of FIGURE 5 and its upper retracted position of FIGURE 2. To this end, the curling die is releasably secured to a movable die holder 64, including a number of upwardly extending vertical posts 66. These posts slide in vertical bearings 68 mounted in a horizontal supporting plate 70 which is located over the die holder 64 and is rigidly attached to a supporting frame 72. The lower holding die holder 36 is also rigidly attached to this frame. It is now evident, therefore, that the curling die 30 is supported on the frame 72 for vertical movement between its upper retracted and lower curling positions relative to the holding die 26.

Curling die 30 is driven between its retracted and curling positions by the operating means 32. To this end, the operating means comprise a pneumatic or hydraulic ram 74, including a cylinder 76 rigidly attached to the supporting plate 70 and a plunger 78 movable in the cylinder. Plunger 78 extends downwardly from the cylinder and is attached, at its lower end, to the movable die plate 52. The ram 74 may be either single-acting or double-acting. The illustrated ram is assumed to be a single-acting ram, wherein the ram plunger 78 is extended dowawardly by fluid pressure and is returned upwardly by a spring 80. The upper end of the ram cylinder 76 is connected to a source 82 of working fluid under pressure through a solenoid valve 84. Valve 84 is operated by a control means 86, including a timing mechanism. This timing mechanism is actuated by a switch 88 which is disposed to sense arrival of the curling die 30 at the position illustrated in FIGURE 4. As noted earlier, and hereinafter explained in more detail, this position of the curling die corresponds to the heating position of the tray 10 and the heat source 28. The control means 86 for the valve 84 are arranged to be initially manually actuated to open the valve and thereby effect driving of the curling die 30 from its retracted position of FIGURE 2 toward its curling position of FIGURE 5. The switch 88 responds to movement of the curling die 50, its intermediate position of FIGURE 4, by actuating the timing mechanism embodied in the valve control means. The timing mechanism monmetarily closes the valve 84 in response to actuation of the mechanism by the switch 88, and thereby arrests downward movement of the curling die in its intermediate position. After a preset dwell of time, the timing mechanism reopens the valve to permit continued downward movement of the curling die to its curling position of FIGURE 5. At this point, the control means 86 are again manually actuated to operate the valve 84 to a vent position, wherein the valve communicates the upper end of the ram cylinder 76 to a suitable low pressure fluid receiver 90. The curling die 30 is then returned to its upper retracted position by the ram spring 80.

It is obvious that the switch 88 may be arranged in various ways to sense arrival of the curling die 30 at its intermediate position of FIG. 4. In the particular curling apparatus illustrated, the switch is mounted on the frame 72 in such a way that one of the curling die guide posts 66 engages the switch actuator 92 to retain the switch is one position during movement of the curling die from its upper retracted position to its intermediate position and then disengages the actuator to effect operation of the switch to another position upon arrival of the die at its intermediate position. Downward movement of the curling die to its curling position of FIGURE 5 may be limited in any convenient way, as by mechanical stop means (not shown).

The heat source 28 on the curling apparatus 24 under consideration comprises an electrical heating rod 94, containing an electrical resistance heating element 96. The terminals 98 of this heating element extend to the outside of the heating rod 94 for connection to a suitable electrical power supply. The heating rod is attached by brackets 100 to a spacer 102, secured to the lower leading face of the curling die 30. Also attached to the spacer 102 is a heat shield 104, having an inner, downwardly-sloping deflector 106 which extends part way through the central opening defined by the heating rod.

The arrangement and shape of the heating rod 94 constitutes a major feature of the invention. In this regard, it will be observed particularly in FIGURE 3, that the heating rod is formed into a shape which generally conforms to and complements the outline or contour of the skirt portion on the article to be provided with a beaded edge. In the drawings, for example, the heating rod is formed in to a rectangular shape corresponding to the rectangular outline or contour of the skirt portion 22 on the tray 10. As a result, the heating rod defines a central opening through the heat source 28, having a shape similar to the major cross section of the tray 10 in the plane of its rim flange 18. This opening is made slightly larger than such major section to accommodate relative movement of the tray and holding die 26 through the opening during movement of the curling die 30 from its retracted position of FIGURE 2 to its curling position of FIGURE 5. Moreover, the heating rod is so positioned relative to the curling die and the opening defined by the heating rod is so dimensioned that when the curling die occupies its intermediate position of FIGURE 4, the rod is disposed in confronting surrounding relation to and is generally uniformly spaced from the skirt portion 22 of the tray, along substantially the entire length of the skirt portion, as shown. This position of the heating rod relative to the tray, and particularly relative to its skirt portion, is the heating position, referred to earlier. The heating rod 94, when in this heating position, is thus disposed to heat the skirt portion 22 of the tray 10 to its plastic-forming state. Continued downward movement of the curling die 30 from its intermediate position of FIGURE 4 to its curling position of FIGURE 5 results in movement of the heating rod to a position well below the tray and its skirt portion, as shown.

The heat shield 104, including its deflector 106, has an open rectangular shape conforming to that of the heating rod 94. The shield is arranged in such a way that when the curling die 30 occupies its intermediate position of FIGURE 4, the shield deflector 106 is interposed between the heating rod and the side wall 14 of the tray 10, and the lower edge of the deflector is located just slightly above the level of the currently upper edge of the tray skirt portion 22. The heat shield is then effective to prevent heating and softening of the tray side wall by the heating rod. When the curling die is in its lower curling position, the shield deflector 106 is interposed between the heating rod and the holding die 26, as shown in FIGURE 5, and thereby prevents heating of the holding die by the rod.

In operation of the illustrated curling apparatus 24, the curling die 30 and the heat source 28 mounted thereon are initially retained in their upper retracted position of FIGURE 2, and a preformed or molded thermoplastic tray 10 is placed in its inverted forming position over the holding die 26. The vacuum passage means 48 in the holding die are then evacuated to clamp the tray to the die, and a coolant is circulated through the cooling passage 44 in the holding die to cool the same. The heating rod 94 is now energized to condition the apparatus for a curling cycle.

The curling cycle is initiated by manually operating the control means 86 to initially open the valve 84 and thereby admit high pressure working fluid to the upper end of the ram cylinder 76. The ram plunger 78, along with the curling die 30 and heating rod 94, are then driven downwardly toward the holding die 26. Arrival of the curling die at its intermediate position of FIGUE 4 results in tripping of the switch 88 and resultant actuation of the timing mechanism embodied in the valve control means 86. This timing mechanism then closes the valve 84 for a preset dwell time. The heating rod 94 is thus arrested in its heating position of FIGURE 4 for this dwell time, during which the skirt portion 22 on the tray 10 is exposed to and is thus heated to a soft plastic-forming state by the heat emanating from the rod. The temperature of the heating rod and the dwell time during which the rod remains stationary in its heating position are adjusted to effect heating of the tray skirt portion to the proper plastic-forming temperature. At the conclusion of this preset heating period, the timing mechanism in the control means 86 reopens the valve 84 to effect continued downward movement of the curling die 30 from its intermediate position of FIGURE 4 to its curling position of FIGURE 5. As the curling die approaches its curling position, the curved wall surface 60 of the curling channel 58 within the curling die engages the currently heated and softened skirt portion 22 of the tray 10 and curls this portion inwardly and downwardly into a cylindrical bead configuration B, as shown. The heat sink surface 34 on the holding die 26, aided by the cooling action of the coolant circulating through the holding die, is effective to retain the inner flange portion 20 of the tray in a relatively cool and hard condition during heating and subsequent curling of the tray skirt portion 22, thus to permit proper curling of the skirt portion into its bead configuration. Attention is directed here to the fact that due to the controlled heating of the skirt portion which occurs during operation of the apparatus, the upper leading edge of the skirt portion relative to the direction of travel of the heat source is heated and softened to a greater degree than the lower juncture of the skirt portion with the flange portion. This causes the leading skirt edge to shrink and thereby induce initial curling of the skirt portion.

As noted earlier, the heat shield 104, and particularly its deflector 106, prevent heating of the side wall 14 of the tray during heating of the skirt portion and heating of the holding die 26 during curling of the skirt portion. Holding die 26 is undercut at 112 to further reduce undesired heating from the source 28.

The curling die 30 is retained in its curling position until the bead on the tray 10 is properly set, after which the control means 86 are manually operated to permit spring return of the curling die 30 and heating rod 94 to their upper retracted positions of FIGURE 2 to complete the curling cycle. The beaded tray 10, which then has the appearance illustrated in FIGURE 1b, is now removed from the holding die 26 to permit placement thereon of another unbeaded tray.

Figure 6:
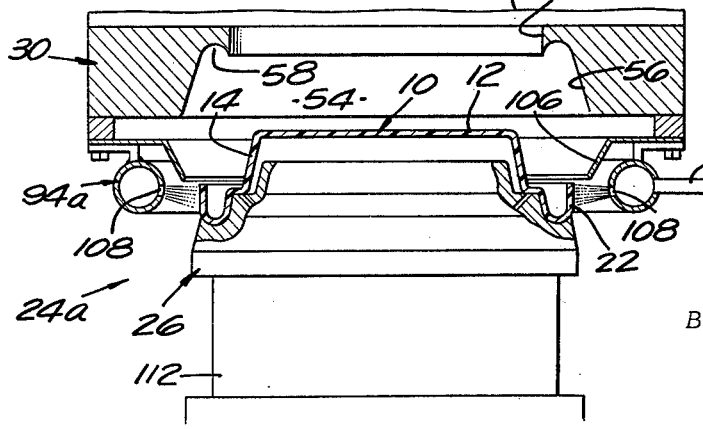
FIGURE 6 is a fragmentary side elevation, partly in section, of a modified curling apparatus according to the invention.

The modified curling apparatus 24a, illustrated in FIGURE 6, is identical to the curling apparatus just described, except that the heating rod 94 in the latter apparatus is replaced, in the modified curling apparatus, by a tubular hot gas manifold 94a, having a number of ports or orifices 108 opening through its inner side. These orifices are generally uniformly spaced along the entire length of the manifold. Extending from the manifold is an inlet 110 for connection to a source of hot gas, such as air. During operation of the modified curling apparatus 24a, the hot gas entering the manifold 94a is discharged inwardly through its orifices 108 to heat, to the proper plastic-forming temperature, the marginal skirt portion 22 of the tray 10 on the holding die 26 of the apparatus when the manifold occupies its heating position of FIGURE 6. It will be understood, of course, that the hot gas manifold 94a in the curling apparatus 24a, like the heating rod 94 in the curling apparatus 10, is formed to a shape which generally conforms to and complements the outline or contour of the skirt portion on the plastic article to be provided with a rim bead. The hot gas manifold in the curling apparatus of FIGURE 6, therefore, has the same rectangular shape as the heating rod 94 in the curling apparatus of FIGURES 1 through 5. Obviously, other types of heat sources than those illustrated may be employed in the present curling apparatus.

It is now evident, therefore, that the invention herein described and illustrated is fully capable of attaining the several objects and advantages preliminarily set forth.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. Curling apparatus for forming a bead about the rim of a thin-walled thermoplastic article having a preformed rim flange including a flange portion extending outwardly from the wall of said article and a depending marginal skirt portion along the outer edge of said flange portion, said apparatus comprising:

a holding die, a heat source, and a curling die, said heat source being mounted directly on and in advance of said curling die for relative movement of said heat source and curling die in unison with respect to said holding die;

operating means for effecting initial relative movement of said holding die and heat source to and then from a heating position and subsequent relative movement of said die to a curling position, said operating means comprising means for effecting relative movement of said holding die, curling die, and heat source in such a manner that the relative movement of said curling die and heat source with respect to said holding die involves unified relative movement of said heat source and curling die through said heating position to said curling position;

said holding die including supporting means for supporting said article in a forming position wherein said skirt portion of said article is exposed beyond said holding die;

said heat source including heating means which generally conform to and complement the contour of said exposed skirt portion for heating said exposed skirt portion to a relatively soft plastic-forming state while said holding die and heat source are in said heating position; and said curling die including curling means engageable with said exposed skirt portion for curling said skirt portion into a generally cylindrical bead configuration upon relative movement of said dies to said curling position.

2. Curling apparatus according to claim 1, wherein: said operating means comprises a drive element coupled to said curling die, and sensing means coupled to said drive element to control the activation thereof, and said sensing means sensing relative movement between said curling die and said holding die for momentarily arresting relative movement of said holding die and heat source in said heating position.

3. Curling apparatus according to claim 1, wherein: said heat source has a central opening similar in shape to and slightly larger than said rim flange and is effective to transmit heat into said opening about substantially the entire circumference thereof, said operating means comprise means for effecting relative movement of said holding die and heat source in such a manner that the relative movement of said holding die with respect to said heat source occurs through said opening, and said heat source when in said heating position is disposed in surrounding generally uniformly spaced relationship to said rim flange in said forming position of said holding die, whereby said heat source is effective to generally uniformly heat said rim flange about the entire circumference of said article.

4. Curling apparatus according to claim 3, wherein: said heat source comprises a relatively long slender heating element formed into a closed loop shape conforming generally to the parametrical contour of said article and defining said heat source opening.

5. Curling apparatus according to claim 4, wherein: said heating element comprises an electrical heating rod.

6. Curling apparatus according to claim 3, wherein:

said heat source comprises a tubular hot gas manifold formed into a closed loop shape defining a central opening similar in shape to and slightly larger than the periphery of said article, and said heating means comprise means for supplying hot gas to the interior of said manifold and orifice means in the wall of said manifold about said opening through which said gas issues from said manifold into said opening.

7. Curling apparatus according to claim 1, wherein:
said holding die comprises a heat sink surface for supporting and cooling said container flange portion, and
a heat shield mounted on said curling die for shielding said container wall against heat from said heat source when the latter is in said heating position and shielding said holding die against heat from said heat source when said curling die is in said curling position.

8. Curling apparatus according to claim 1, wherein:
said heat source comprises a long relatively slender heating element formed into a closed loop surrounding and defining said heat source opening.

References Cited
UNITED STATES PATENTS

| | | |
|---|---|---|
| 751,300 | 2/1904 | Kennard. |
| 1,768,768 | 7/1930 | Johnson. |
| 3,087,390 | 4/1963 | Ruza. |
| 3,271,503 | 9/1966 | Shelby. |
| 3,357,053 | 12/1967 | Lyon et al. |

WILLIAM J. STEPHENSON, Primary Examiner